J. W. L. WARREN.
MILKING MACHINE APPARATUS.
APPLICATION FILED AUG. 30, 1913.
1,222,826.
Patented Apr. 17, 1917.
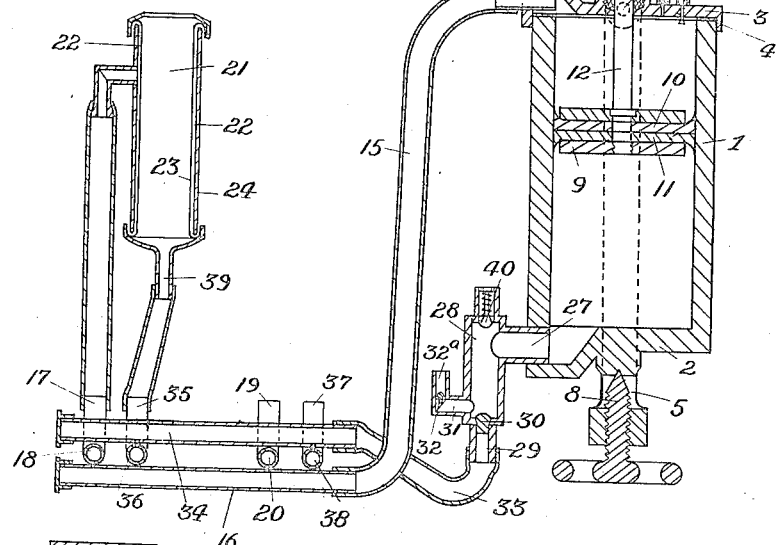
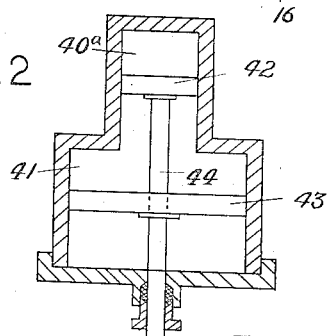
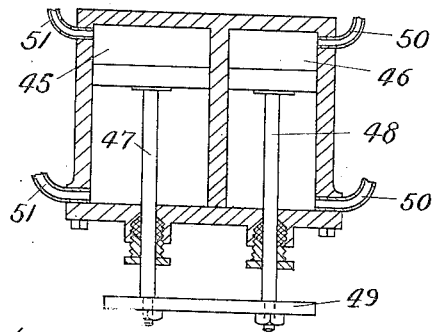
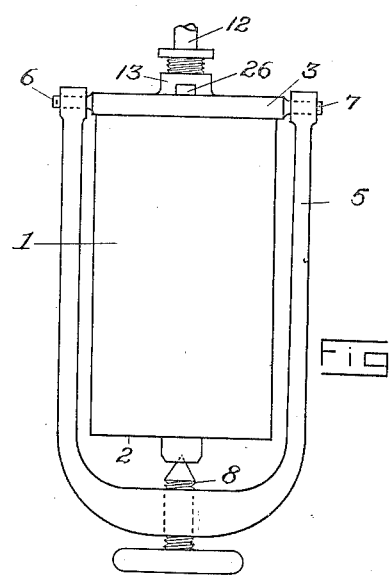
Witnesses.
Franklin C. Low
Leonard A. Powell
Inventor.
John Wilfred Llewellyn Warren.
by Charles N. Gooding.
Attorney.

UNITED STATES PATENT OFFICE.

JOHN WILFRED LLEWELLYN WARREN, OF AUCKLAND, NEW ZEALAND.

MILKING-MACHINE APPARATUS.

1,222,826.  Specification of Letters Patent.  Patented Apr. 17, 1917.

Application filed August 30, 1913. Serial No. 787,407.

*To all whom it may concern:*

Be it known that I, JOHN WILFRED LLEWELLYN WARREN, a subject of His Majesty the King of the United Kingdom of Great Britain and Ireland, resident of the city of Auckland, in the Provincial District of Auckland and Dominion of New Zealand, have invented a new and useful Improved Milking-Machine Apparatus, of which the following is a specification.

My invention has for its objects the simplifying of milking machine apparatus, the improved working of same and the provision of a milk releaser. I am aware that pumps have been employed prior to my invention for creating a vacuum upon one side of the inflater of a teat cup, and pressure upon the other side thereof by one stroke of a pump.

My invention consists in the use of a small vacuum pump with the necessary valves, working on air or other fluid, and attached to each set of teat cups. The movement of the pump piston in one direction causes pressure to be exerted on the outside of each inflater while the suction at the same time exerted from the other side of piston on to the inside of each inflater provides the partial vacuum by which the cups are held on to the teats and the milk is drawn away. During the movement of the piston in the opposite direction it gradually withdraws the pressure from the outside of the inflater substituting therefor the suction of a partial vacuum while at the same time the pressure now being gradually exerted by the other side of the piston closes the valve by which the milk entered the cylinder of the pump, and forces the milk out through the milk outlet valve which has hitherto been closed.

An alternative method of obtaining the same effect is by the use of two single acting pumps.

The said pump or pumps may also be used simply to produce a partial vacuum alternately on the inside and outside of the inflater.

The pistons of said pumps may be actuated by any suitable means.

The invention is illustrated diagrammatically in the drawings, wherein,

Figure 1 is a sectional elevation of the apparatus.

Fig. 2 a similar view of a modification in which the cylinder has two diameters.

Fig. 3, a similar view in which two cylinders of different diameters are employed, and Fig. 4 is a side view of the pump cylinder shown in Fig. 1 and showing the mounting thereof.

The cylinder 1, which may be opaque or of glass or other transparent material, has the end 2 closed while the opposite end is provided with a cover 3 which closely fits the cylinder and is provided with a packing ring 4 to insure an air tight joint.

The cover is clamped in position by a bridle 5, the ends of which are journaled upon pins 6 and 7 projecting from the cover. The bridle passes around the cylinder and has a clamping screw 8, the point of which fits into a recess in a projection from end 2.

By turning back the screw the bridle may be swung upon the pins to clear the cylinder and allow the latter to be removed from the cover.

A piston 9 reciprocable by a crank and connecting rod or other usual means and rendered double acting by opposed bucket leathers 10 and 11 or other usual means, has a piston rod 12 passing through a stuffing box 13.

One end of the cylinder is in open communication through a port 14 with the pulsation pipe 15 which is connected to a tube 16 having the branches 17, 18, 19, and 20, which are severally connected each to one of a set of teat cups such as 21, whereby upon the reciprocation of said piston 9, air is alternately withdrawn from and forced into the annular spaces 22 between the flexible inner lining or inflater 23 and rigid outer casing 24 of each of the teat cups.

A regulatable relief valve 25 allows air to escape from the cylinder when a predetermined pressure of air has been produced therein, and an adjustable inlet valve 26 may be regulated to admit air to the cylinder in case it should be desired to break down the vacuum therein.

By this means the pressure and degree of vacuum in the annular spaces 22 of the teat cups may be regulated to produce the best effect.

The opposite end of the cylinder has a port 27 in communication with a valve chamber 28 having the inlet nipple 29 provided with a valve 30 and a delivery nipple 31 having the valve 32.

The inlet nipple is in communication through the milk pipe 33 with a pipe 34 having branches 35, 36, 37 and 38 which are severally connected each to the suction nipple 39 of one of the set of teat cups.

The delivery nipple 32ª is connected to the main pipe which conveys the milk to a receptacle.

An adjustable air inlet valve 40 permits the admittance of a regulatable quantity of air through the valve chamber 28.

It will be seen that upon movement of the piston in one direction, partial vacuum is produced in each teat cup and milk thereby drawn from the teat while simultaneously the teat is squeezed by pressure set up around the flexible lining.

If it should be considered advisable to differentiate in the capacities of what I call the milk and air sides of the pump, this may be readily effected by either of the arrangements illustrated in Figs. 2 and 3.

In Fig. 2 the cylinder is in two parts 40ª and 41 of different diameters, the pistons 42 and 43 being upon the same rod 44.

In Fig. 3 the air cylinder 45 and milk cylinder 46 are located side by side and the rods 47 and 48 of their respective pistons connected to a cross head 49 so that they are reciprocated together.

In this arrangement both ends of the milk cylinder may be connected by pipes 50 to a valve chamber 28 which is such as previously described.

Both ends of the air cylinder are connected by pipes 51 to pulsation pipes 15.

It will be seen from the above that the pump may have a single cylinder or two co-axial cylinders of equal diameter or two cylinders arranged parallel and side by side.

Having now fully described my invention, what I desire to claim and secure by Letters Patent is:—

1. Milking apparatus comprising in combination a teat cup having an external casing and an internal flexible lining and pumping means communicating with the space between the said flexible lining and the said external casing said pumping means being adapted to transmit pulsations to said flexible lining and to draw milk into said pumping means and discharge the same therefrom.

2. Milking apparatus comprising in combination a set of teat cups each having an external casing and an internal flexible lining and pumping means, including a pump cylinder communicating at one end with the space between the said flexible lining and the said external casing, said pumping means being adapted to transmit pulsations to said flexible lining and to draw milk into and discharge the same from the other end of the cylinder of the pumping means.

3. Milking apparatus comprising in combination, a set of teat cups, a flexible lining arranged in each cup and so located as to form an annular space with the casing of said cup, suction nipples to said teat cups, a pump, connecting means extending from said suction nipples to one end of the pump cylinder, connecting means extending from said annular space of the teat cups to the other end of the pump cylinder, a valve chamber in said first-mentioned connecting means, and a milk delivery pipe, the movement of the pump piston in one direction producing a pressure against the lining in the teat cups and simultaneously creating a vacuum in the interior of the teat cups causing milk to flow through the valve chamber into the pump cylinder, the return movement of the piston causing a vacuum in the annular space of the teat cups simultaneously discharging the milk through the valve chamber into the delivery pipe.

JOHN WILFRED LLEWELLYN WARREN.

Witnesses:
GEORGE WILLIAM BASLEY,
MARY CHRISTINA BRENNAN.